United States Patent [19]
Backman

[11] Patent Number: 5,311,976
[45] Date of Patent: May 17, 1994

[54] METHOD AND ARRANGEMENT FOR OPENING A SELF-CLOSING GRIPPER ON A GRIPPER CONVEYOR

[75] Inventor: Ralf Backman, Eksjö, Sweden

[73] Assignee: Idab-Wamac AB, Eksjo, Sweden

[21] Appl. No.: 971,660

[22] Filed: Nov. 5, 1992

[30] Foreign Application Priority Data

Nov. 7, 1991 [SE] Sweden .................. 9103290

[51] Int. Cl.⁵ .......................................... B65G 37/00
[52] U.S. Cl. ............................ 198/349.1; 198/365; 198/470.1; 198/477.1; 271/82; 271/277
[58] Field of Search ............... 271/82, 274, 272, 273, 271/277; 198/365, 349.1, 352, 353, 354, 470.1

[56] References Cited

U.S. PATENT DOCUMENTS

| | | | |
|---|---|---|---|
| 2,476,371 | 7/1949 | Haumann | 198/349.1 |
| 2,666,536 | 1/1954 | Smith | 198/349.3 |
| 3,713,648 | 1/1973 | Spika | 271/79 |
| 4,358,009 | 11/1982 | Rysti | 198/365 |
| 4,448,408 | 5/1984 | Faltin | 271/277 |
| 4,512,457 | 4/1985 | Reist et al. | 271/277 X |
| 4,799,664 | 1/1989 | Burger | 271/277 |
| 4,905,986 | 3/1990 | Muller | 271/277 |
| 4,921,294 | 5/1990 | Klopfenstein | 271/268 X |
| 4,953,847 | 9/1990 | Honegger | 271/277 |
| 5,007,629 | 4/1991 | Eberle et al. | 271/277 |
| 5,064,187 | 11/1991 | Muller | 271/268 X |

FOREIGN PATENT DOCUMENTS 667860 11/1988 Switzerland .

Primary Examiner—H. Grant Skaggs
Assistant Examiner—Carol Lynn Druzbick
Attorney, Agent, or Firm—Keck, Mahin & Cate

[57] ABSTRACT

In order to enable a gripper carried by a rapid moving gripper conveyor to be opened and therewith release an object gripped by the gripper, for instance a newspaper, without influencing neighboring grippers, the gripper is opened (45', 47) while moving along a path which is shorter than the distance (t) at which the grippers are spaced on the gripper chain (1) and the opened gripper is held open by means (4, 45') which only act on the thus opened gripper. The means which holds the gripper open accompanies the movement of the gripper conveyor. The method and the arrangement find use in conveyors that are provided with self-closing grippers where the conveyors have a high conveying capacity and enable independent release of individual objects. An opened gripper is held open while the gripper moves through a distance which is greater than the gripper spacing interval and which is sufficiently long to ensure that the object will fall free from the gripper.

9 Claims, 3 Drawing Sheets

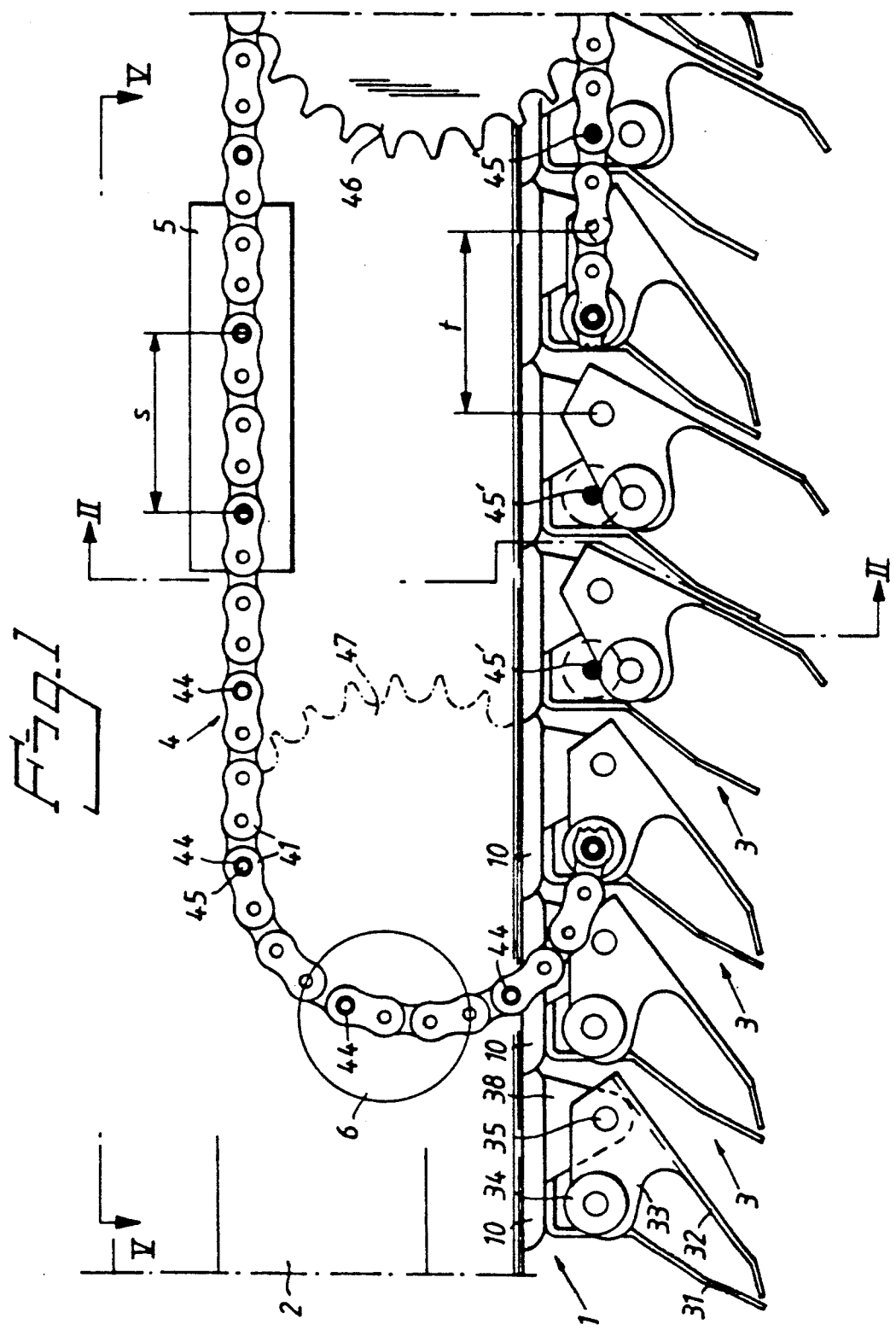

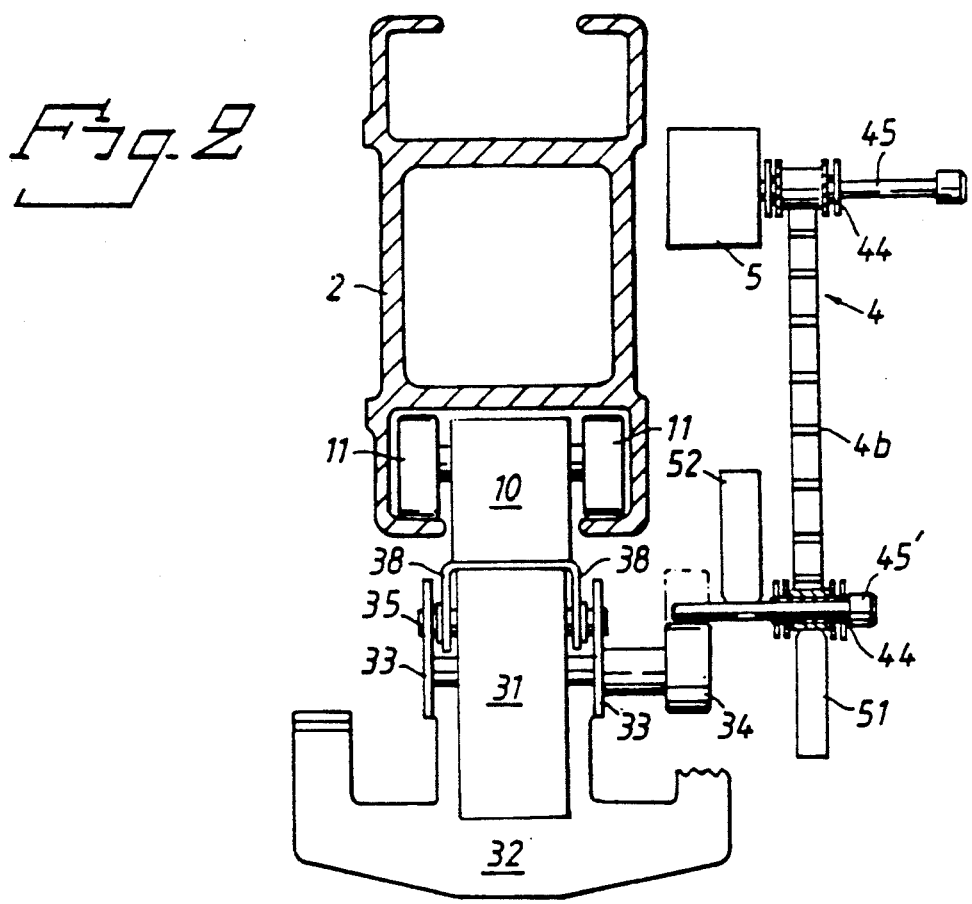
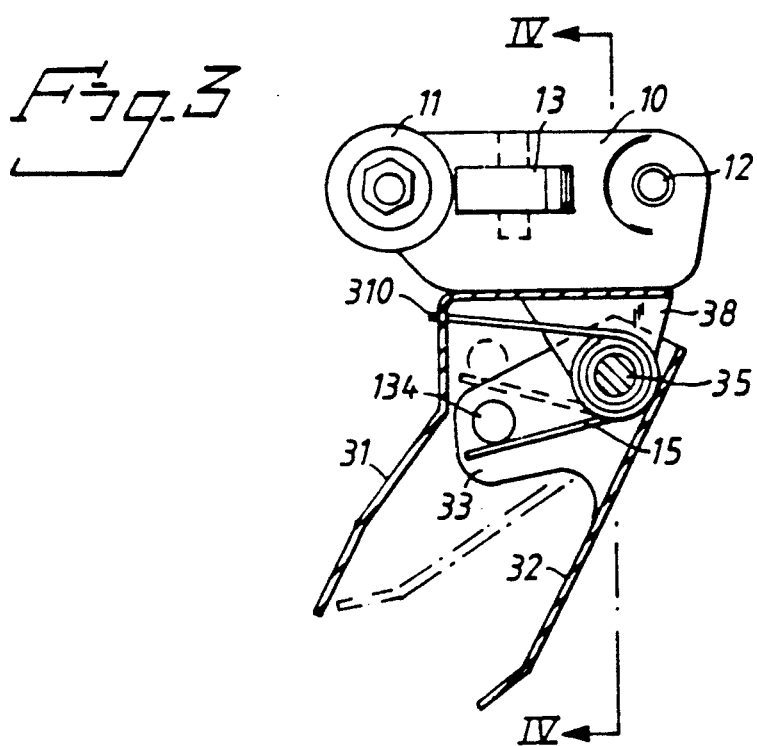

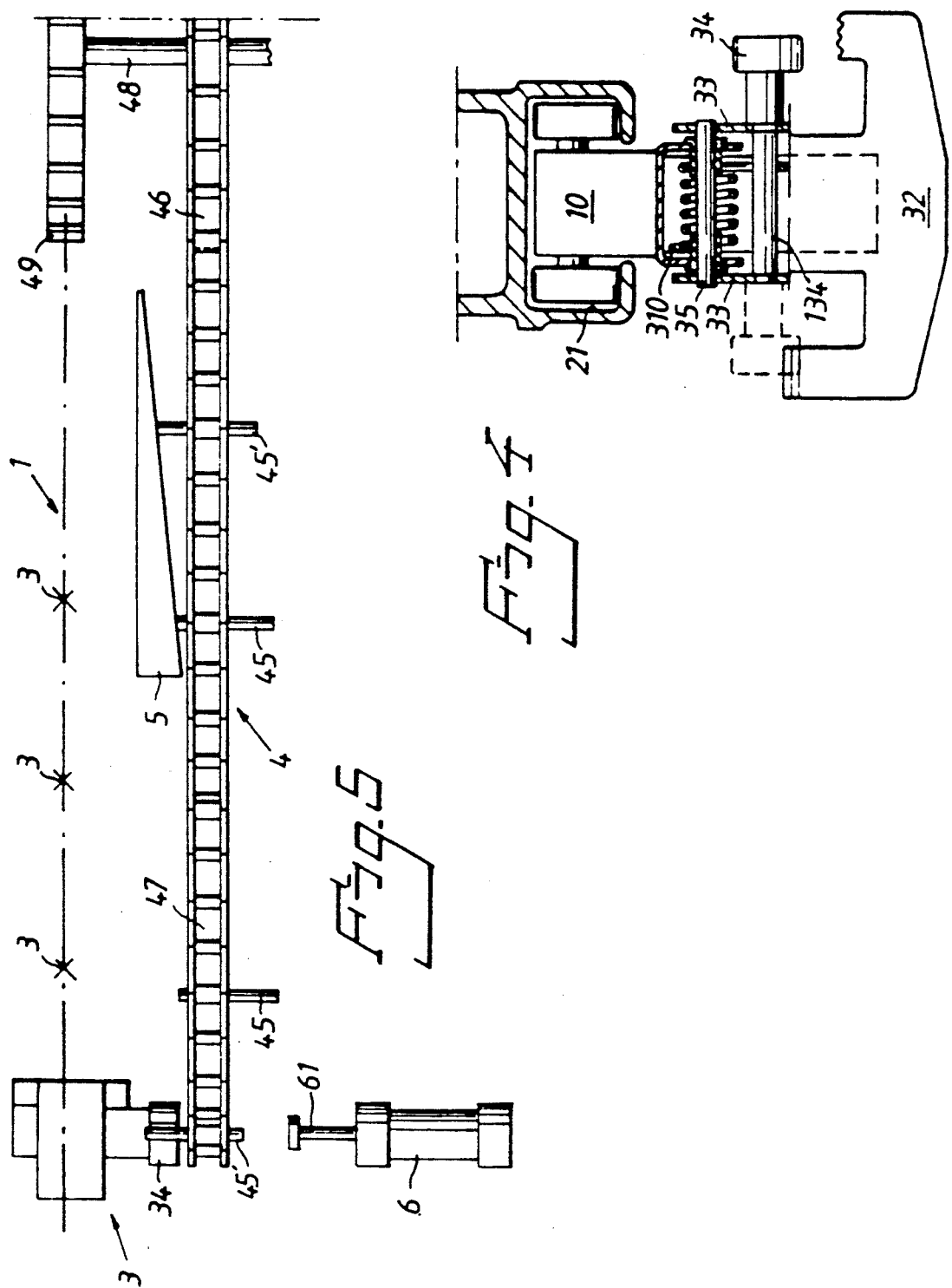

METHOD AND ARRANGEMENT FOR OPENING A SELF-CLOSING GRIPPER ON A GRIPPER CONVEYOR

FIELD OF THE INVENTION

The present invention relates to a method for opening temporarily a self-closing gripper on a gripper conveyor.

The invention also relates to an arrangement for opening temporarily a self-closing gripper of a gripper conveyor.

BACKGROUND OF THE INVENTION

Grippers for gripper conveyors intended for the separate transportation of objects, such as printed matter, have, in practice, earlier been of complex construction and, among other things, have included a releasable latching device by means of which the gripper is held latched in a closed state. When the gripper passes a stationary cam, the latch is released and the gripper opened so as to allow the object to fall from the gripper. Such latch equipped grippers have the advantage that the gripper will remain open after having released the object, and that, in conjunction with gripping a further object, the gripper need only be closed around this object and then latched or locked automatically in its closed state. Furthermore, the known grippers have the advantage that a newspaper or like printed matter is readily afforded the time needed to drop from a downwardly facing gripper whose release latch has been activated, irrespective of whether neighbouring grippers have been opened or not.

However, one troublesome drawback with such latch equipped grippers resides in their complexity and therewith in their expense and sensitivity to disturbances. These known grippers also incur high service costs.

Consequently, in practice, the trend has been towards the use of self-closing grippers, i.e. grippers which include two legs which can be pivoted in relation to one another and which are biased towards one another by means of a spring device. Such self-closing grippers are based on the clothespeg principle and afford important advantages, in that the grippers can be produced at low costs, given a simpler function, are highly reliable in operation and incur low service costs. These known self-closing grippers are constructed to be opened temporarily as they pass and are activated by a stationary gripper opening cam. In this regard, a problem is encountered when desiring to open solely one or a few grippers in order to allow the grippers to release the object held thereby, i.e. a newspaper or like object. The problem occurs when it is desired to extract one or a few newspapers or like printed matter from the newspaper stream in order, for instance, to check the quality of the print, without disturbing the smoothness of the newspaper stream in the continued handling thereof. A similar problem also arises when desiring to extract single newspapers from the stream, for instance when wishing to open e.g. each alternate gripper or every third gripper in order to form a newspaper bundle, an overlapping stream of newspapers, or the like, and further difficulties arise when wishing to switch between different desired gripper opening programs.

The problem indicated arises from the following circumstances:

The gripper spacing on the conveyor is relatively small, for instance 50 mm (or about 2 inches), while the conveyor is moved at a relatively high speed, e.g. a speed of 1 m/s, so that the conveyor will have the desired high transport capacity, e.g. an hourly capacity of 72,000 newspapers.

Furthermore, for safety reasons, the gripping depth of the grippers (the leg length) must fulfill a given minimum value, for instance a value of 45 mm. The time taken for a newspaper to fall gravitationally from a downwardly facing, open gripper pass free from the extremities of the gripper legs, will thus depend on the leg gripping depth. In the case of those transporting situations that are now often relevant and that have been described by way of example above, the time interval between two immediately adjacent grippers on the moving conveyor is shorter than the time required for the newspaper to fall free from the gripper. It will be seen from this that the conventional technique of opening such single grippers, i.e. the use of a stationary gripper opening cam, is encumbered with certain deficiencies, since if the cam is made sufficiently long to activate a gripper over the time period required for the newspaper to have time to fall from the gripper, the cam will also activate the next-following gripper, so that the position of the newspaper held by this gripper is displaced before the newspaper is again gripped by the gripper when the cam is lifted to one side. Because the position of the newspaper in the gripper last activated is disturbed, problems occur further on in the handling of the product series, and particularly when this series has the form of an overlapping newspaper stream.

Consequently, in accordance with the known technique, it has been necessary in conjunction with the use of self-closing grippers either to restrict the conveying capacity, so as to ensure that individual grippers will be opened in a functionally correct fashion and thus enable correct release of individual newspapers, or it has been necessary to accept limited usefulness of self-closing grippers, namely when all grippers shall be opened at a station with the aid of a stationary gripper opening cam of sufficient height.

CH-A-667 860 reveals a conveyor with self-closing grippers, of which only every second or all grippers are temporarily opened at an opening station, by means of an orbiting series of opening cams. US-A-3,713,648 reveals a conveyor in which all grippers are temporarily opened at an opening station by means of a circulating series of opening cams.

SUMMARY OF THE INVENTION

One object of the invention is therefore to avoid the drawbacks of this known technique and to enable a selected number of individual randomly chosen self-closing grippers of the conveyor to be opened (even single grippers) irrespective of the conveying capacity of the gripper transporter, without affecting or disturbing neighbouring grippers or the other grippers as to open or closed state.

The inventive method of temporarily opening self-closing grippers which are spaced apart at regular intervals and which have mutually similar orientation on a moving conveyor chain comprises the steps of selecting a gripper which it is desired to open, opening the selected gripper independently of the other grippers and holding the selected opened gripper open independently of the other grippers along a gripper transport path which is longer than the spacing between the grippers on the conveyor chain.

As above indicated, each self-closing gripper is constructed so that one gripper leg can, in principle, be fixedly connected to a guided link in the conveyor chain, whereas the other gripper leg is provided with an operating arm which can be activated to open the gripper against the action of a gripper spring means.

According to one embodiment, a moveable device is caused to activate the manoeuvering arm of a selected gripper so as to open the gripper, wherein the moveable device is caused to accompany the gripper concerned through a distance which is greater than the spacing interval of the grippers on the conveyor chain. These moveable devices are therewith conveniently mounted on an individual conveyor and are spaced apart at the same intervals as the spacing intervals of the grippers on the gripper conveyor chain, wherein the conveyor is intended to move synchronously with the conveyor chain and is conveniently driven thereby. The selector means may be arranged to activate the moveable devices so that said devices are able to coact with the selected grippers along the conveyor part, or run, which extends parallel with and adjacent to the conveyor chain, while resetting means may be provided for subsequent return of the dogging devices to their starting position. In this latter case, the conveyor will preferably include two guide wheels, for instance chain wheels with horizontal and mutually parallel shafts and a conveyor chain which is provided with guides for the moveable devices having the form of axially moveable pins which extend parallel with the shafts. These resetting means may then comprise a cam-controlled rail or bar which is mounted on one side of the upper conveyor-run in a manner to move the pins successively to one end position in the guides, through a wedge action, whereas the gripper selecting means may include a controllable or an electromagnetic setting device which is located in the region at which the upper run of the conveyor chain turns to the region of the lower conveyor run, where selected pins are thus moved axially by the setting device to an active position in which they are able to activate an operating arm on a selected gripper.

It will be understood that the inventive concept can be realized in several different ways, one of which exemplified by the embodiment briefly described above and which will be described in more detail herebelow.

BRIEF DESCRIPTION OF THE DRAWINGS

The invention will now be described in more detail with reference to two exemplifying embodiments of the invention and also with reference to the accompanying drawings, in which FIG. 1 is a schematic side view of one embodiment of an inventive conveyor arrangement;

FIG. 2 is a schematic, partially sectioned view taken on the line II—II in FIG. 1;

FIG. 3 is a schematic, sectioned view of a gripper mounted on an associated conveyor chain link;

FIG. 4 is a schematic view taken on the line IV—IV in FIG. 3; and

FIG. 5 is a schematic view taken on the line V—V in FIG. 1.

DETAILED DESCRIPTION OF THE PREFERRED EMBODIMENTS

An inventive gripper conveyor includes an orbital conveyor chain 1 provided with links 10 which carry grippers 3. Each gripper 3 includes a fixed gripper leg 31 which is connected to its respective link 10. The leg 31 has mounted on each side thereof a pivotal lug or flap 38 which is supported on a pivot journal shaft 35. The gripper 3 also includes a moveable leg 32 which is provided with two separated suspension tongues 33 which are pivotally journalled on the shaft 35. The tongues 33 carry a transverse shaft 134 which carries an external operating roller 34. A biassing spring 15 biases the leg 32 in a direction towards the leg 31. In the illustrated embodiment, the spring 15 is a coil spring which is placed around the shaft 35 and which has an end leg which supports against the shaft 134 and a further end leg which engages a hole 310 in the fixed gripper leg 31. The moveable gripper leg 32 is preferably broadened and is provided with curved end-lugs which define two mutually separate support points for, e.g., the fold of a newspaper to be gripped by the gripper, so that the newspaper will be aligned stably with relation to the gripper 3.

It will readily be seen from FIGS. 3 and 4 that the rear end of the chain link 10 is provided with a pair of runners 11 and at its forward end is provided with a journal 12 which enables the link 10 to be connected to the neighbouring link by means of its runner journal shaft. The link 10 may also be provided with lateral guide wheels 13, as illustrated in FIG. 3. The link 10 is guided for movement in a guide channel 21 provided in a chain guide-profile 2.

It will be seen from FIGS. 1 and 2 that a conveyor chain 4 is mounted by the side of conveyor 1 and extends parallel with said conveyor chain. The lower part, or run, of the conveyor chain 4 extends parallel with and adjacent to the gripper operating wheel. The lower part, or run, of the chain 4 is supported on a linear straightedge or bar 51.

It will be seen from FIG. 1 that the chain 4 includes chain links 41 of which at least some have hollow shafts 44 which are disposed at a spacing interval of s. Axially displaceable pins 45, 45' are mounted in the hollow shafts 44. In the illustrated embodiment, the pins 45 are directed horizontally and transversly to the direction of movement of the lower run of the chains 1 and 4. The pin references 45 and 45' indicate the respective positions of displacement shown in FIG. 2. As will be seen from FIG. 2, the construction includes an upper bar 52 which rests on top of the pins 45', driven to the left in the Figure, so as to prevent the pins from being lifted upwards.

It will also be seen from FIG. 1 that the gripper links 3 are spaced at intervals t which coincides with the spacing intervals s. The chain 4 is driven synchronously with the chain 1, with alignment between the guides 44 and the operating rollers 34 in the lower part of the conveyor chains.

As can be seen from FIG. 5, an operating device 6 comprising a cylinder fitted with a cylinder rod 61 is intended to move a pin 45' axially in the hollow shaft 44 of a passing link 41 to an active position in which the pin 45' supports against the operating roller 54 so as to rotate the roller together with the moveable gripper leg 32 in an anti-clockwise direction in FIG. 1 to a position in which the gripper is open.

The lower part or run of the chain 2 is considerably longer than the spacing interval s or t and consequently a gripper 3 can be held open along a path which is greater than the spacing interval s or t without influencing, or being influenced, by a neighbouring gripper. The length of the lower run of the chain 4 is chosen to provide time for a gripped newspaper or the like to fall clear of its gripper while still located along the lower run of the chain 4, where the speed of the gripper chain 1, the gripper spacing interval t and the extent to which the newspaper is gripped by a gripper are such that the newspaper is unable to fall free from its gripper while the gripper moves along a path which corresponds in length to the spacing interval t.

It can also be discerned from FIGS. 2 and 5 that a returning wedge 5 is mounted along the upper run of the chain 4, and that the pins displaced axially by the operating device 6 are returned to their starting positions by the wedge 5 before again passing the operating device 6.

It can also be discerned from FIG. 5 that the chain 4 extends around chain wheels 46, 47, of which one chain wheel 46 can be connected, via a transmission 48, to a chain wheel 49 which engages the gripper chain 1 and is driven synchronously therewith.

The chain wheel 47 forms a gripper opening means, i.e. a means for bringing the pin, which has been moved to an active position and is carried by the chain 4 on the chain wheel, to successively approach the operating arm of a selected gripper and to drive the arm to a position in which the gripper is fully open.

The means for holding an open gripper open is dependent on arranging the chains 4 and 1 moving at mutually the same speed, parallel and adjacent to one another, along the lower run of the chain 4, so that a pin is able to accompany the operating arm on a gripper opened by the pin and therewith hold the open gripper open along the length of the aforesaid lower part or run of the chain 4.

When seen in the direction of the rectilinear gripper path, a given relative movement will occur between the pin which approaches the manoeuvering arm of the gripper concerned during the gripper opening sequence, although this relative movement is comparatively small and will have no deleterious effect provided that the operating arm or its roller has an effective length in the direction of movement of the chain 1 moves.

The size of the chain wheel 47 will be such that the gripper opening sequence can be carried out along a distance which is shorter than the gripper spacing interval.

The gripper-selecting device includes the cylinder/-setting device 6 which is located centrally of the path of the chain 4, so as to be able to drive a selected pin to its active position. The cylinder 6 may be controlled so that it can only be activated when a pin is in alignment with the plunger or punch of the cylinder 6. The cylinder can be activated selectively by hand or may be constructed to activate, e.g., each alternate pin on the chain 4. A roller 34 is mounted on the end of the operating arm 33 so as to avoid wear on the grippers when all grippers shall be opened at a station by means of a stationary gripper opening cam of appropriate length. Particularly in view of the relative movement between the operating arm and the pin during the course of a gripper opening operation, it is suitable to allow the pin to coact with the roller 34 also in the case of the inventive arrangement and inventive method respectively.

An essential feature of the invention is that the moveable devices (for example the link hole shafts and the pins displaceable therein) selectively and temporarily can be activated to co-act with any chosen gripper to open it, without causing other grippers to open, the moveable devices preferably being carried by an endless chain to move synchronously with the grippers along a path having a length which permits the grippers to be kept open sufficiently long time to let the newspaper or the like be moved out of its gripper while the gripper is kept open.

The grippers opened in accordance with the invention are intended to transport such articles or objects as printing products, including printing plates, and also printed articles, such as printed sheets, newspapers, periodicals, etc.

I claim:

1. A method for opening self-closing grippers (3) disposed at regular spaced intervals (t) and mutually similar orientation on a driven first conveyor chain (1), comprising the steps of:
    selecting whether a self-closing gripper (3) is to be opened or is to remain closed independently of whether the gripper immediately preceding the selected gripper was selected to be opened or to remain closed,
    opening the gripper (3) selected to be opened independently of the other grippers, and
    maintaining the opened gripper (3) in an open state independently of the other grippers along a gripper conveying path which is longer than the gripper spacing intervals (t) on the first conveyor chain (1).

2. A method according to claim 1, further comprising the steps of causing moveable devices (45, 45') to activate an operating arm on a moveable gripper leg (32) of a selected gripper (3) in a manner to open the gripper (3), and causing the moveable devices (45, 45') to accompany the gripper (3) through a distance which is greater than the gripper spacing interval (t) on the first conveyor chain (1) while holding said gripper open.

3. A method for opening self-closing grippers (3) disposed at regular spaced intervals (t) and mutually similar orientation on a driven first conveyor chain (1), comprising selecting a gripper (3) to be opened, opening the selected gripper (3) independently of the other grippers, and maintaining the opened gripper (3) in an open state independently of the other grippers along a gripper conveying path which is longer than the gripper spacing intervals (t) on the first conveyor chain (1) and comprising causing moveable devices (45, 45') to activate an opening arm on a moveable gripper leg (32) of a selected gripper (3) in a manner to open the gripper (3), and by causing the moveable devices (45, 45') to accompany the gripper (3) through a distance which is greater than the gripper spacing interval (t) on the first conveyor chain (1) while holding said gripper open, said method further comprising supporting a plurality of moveable devices (45, 45') on a moving second conveyor chain (4) at the same spacing interval (s) as the gripper spacing interval (t) on the first conveyor chain (1), and moving the second conveyor chain (4) synchronously with the first conveyor chain (1).

4. A method according to claim 3, by driving the second conveyor chain (4) with the aid of the first conveyor chain (1).

5. A method according to claim 4, characterized in that the moveable devices (45, 45') include axially moveable pins which are displaceably journalled in horizontally oriented hollow shafts between links (41) which form the second conveyor chain (4) arranged essentially in a vertical plane, wherein pins (45) which are intended to coact with a selected gripper (3) are moved axially to respective active positions before the pin moves forwards parallel with the part of the conveyor located adjacent the first gripper chain (1); and in that each pin (45) is returned to an inactive position subsequent to coaction with a gripper.

6. An arrangement for opening self-closing grippers (3) which are disposed on a driven first conveyor chain (1) at regular gripper spacing intervals (t) and similar orientation, comprising means (6, 44, 45) for selecting whether a self-closing gripper is to be opened or is to remain closed independently of whether the gripper immediately preceding the selected gripper was selected to be opened or to remain closed;

means for opening a self-closing gripper selected to be opened independently of the other grippers, means (4, 45, 52) for holding the selected gripper open along a gripper transport path which is greater than the gripper spacing interval (t) on the first conveyor chain (1), independently of the other grippers (3).

7. An arrangement according to claim 6, wherein ends of gripper-operating arms carry a roller (34) for coaction with gripper opening means (45', 47) and means (4, 45', 52) for holding a gripper open.

8. An arrangement for opening self-closing grippers (3) which are disposed on a driven first conveyor chain (1) at regular gripper spacing intervals (t) and similar orientation, characterized by means (6, 44, 45) for opening a selected gripper independently of the other grippers, and by means (4, 45, 52) for holding the selected gripper open along a gripper transport path which is greater than the gripper spacing interval (t) on the first conveyor chain (1), independently of the other grippers (3); and means (6) for selecting a gripper to be opened, characterized in that the opening means includes an orbiting conveyor having one part which moves adjacent a path travelled by free ends of operating arms (33, 33') on a moveable leg (32) of the grippers (3); and further characterized by moveable devices (45, 45') which are disposed on the second conveyor chain (4) at the same spacing interval as the spacing interval of the grippers on the first conveyor chain (1); in that the moveable devices (45, 45') are displaceable between an active position (45') and an inactive position (45), in that the gripper selector means (6) is intended to axially move selected moveable devices (45) to an active position for moving an operating arm on a gripper to a gripper open position; in that the moving second conveyor chain (4) holds the gripper open by causing the moveable devices (45') to accompany the gripper (3) along said one part of the conveyor; and in that returning means (5) are provided for returning respective moveable devices to their inactive position (45).

9. An arrangement according to claim 8, characterized in that the moveable devices (45, 45') include axially moveable pins which are guided in guides (44) that extend transversely to the first conveying chain (1); and in that the second conveyor chain (4) has a part which is essentially parallel to and runs adjacent to the path along which grippers to be opened move.

* * * * *